US012345095B2

(12) United States Patent
Chong

(10) Patent No.: US 12,345,095 B2
(45) Date of Patent: Jul. 1, 2025

(54) FOLDABLE AND ANGULARLY ADJUSTABLE LADDER

(71) Applicant: CHARFONT LIMITED, Hong Kong (CN)

(72) Inventor: Kwok Lai Chong, Hong Kong (CN)

(73) Assignee: CHARFONT LIMITED, Hong Kong (CN)

( * ) Notice: Subject to any disclaimer, the term of this patent is extended or adjusted under 35 U.S.C. 154(b) by 1043 days.

(21) Appl. No.: 17/417,765

(22) PCT Filed: Jun. 2, 2020

(86) PCT No.: PCT/CN2020/093909
§ 371 (c)(1),
(2) Date: Jun. 24, 2021

(87) PCT Pub. No.: WO2020/248871
PCT Pub. Date: Dec. 17, 2020

(65) Prior Publication Data

US 2022/0010620 A1 Jan. 13, 2022

(30) Foreign Application Priority Data

Jun. 12, 2019 (CN) ......................... 201920881109.9
Jun. 12, 2019 (HK) ................................ 19125133.9

(51) Int. Cl.
*E06C 1/383* (2006.01)
*E06C 1/36* (2006.01)
*E06C 1/387* (2006.01)

(52) U.S. Cl.
CPC ................ *E06C 1/387* (2013.01); *E06C 1/36* (2013.01); *E06C 1/383* (2013.01)

(58) Field of Classification Search
CPC . E06C 1/387; E06C 1/36; E06C 1/383; E06C 1/393; E05D 7/0054; F16C 17/10; F16C 11/04; E04F 11/0255; E04F 11/062; E04F 11/064; E04F 11/066; E04F 2011/005; Y10T 403/32606; Y10T 403/32959; Y10T 403/32967; Y10T 403/7047
See application file for complete search history.

(56) References Cited

U.S. PATENT DOCUMENTS 419,821 A * 1/1890 Burrows ................ E06C 1/383
182/161
538,145 A * 4/1895 Allen ..................... A47B 43/00
108/1
947,464 A * 1/1910 Vickers ..................... E04G 1/34
182/226

(Continued)

*Primary Examiner* — Kyle J. Walraed-Sullivan

(57) ABSTRACT

A foldable and angularly adjustable ladder includes two side supports (1) and multiple stair treads (2). Two ends of each of the stair treads (2) are rotatably connected with the side supports (1), respectively. Each of the side supports (1) includes an upper pole (101) and a lower pole (102) parallel to the upper pole (101). Two foot covers (3) are disposed at a lower end of the side supports (1), respectively. Two upper poles (101) and two lower poles (102) are connected with two end surfaces of the each of the stair treads (2) through four connectors (4), respectively. Each of the connectors (4) is sleeved with a metal ring piece (5), one end of the metal ring piece (5) passes through one of the end surfaces of the each of the stair treads (2) and is located at an inner side of the each of the stair treads.

5 Claims, 9 Drawing Sheets

(56) References Cited

U.S. PATENT DOCUMENTS

| | | | | | |
|---|---|---|---|---|---|
| 1,419,834 | A * | 6/1922 | Fellows | E04F 11/04 | 182/86 |
| 2,220,155 | A * | 11/1940 | Jachim | E06C 9/06 | 182/1 |
| 2,245,825 | A * | 6/1941 | Ross | A47C 1/12 | 108/1 |
| 3,446,311 | A * | 5/1969 | Alfie | E06C 1/387 | 182/116 |
| 3,626,438 | A * | 12/1971 | Cornell | E04F 11/0255 | 52/191 |
| 4,619,544 | A * | 10/1986 | Laidely | B60G 5/02 | 403/162 |
| D383,336 | S * | 9/1997 | Van Der Merwe | D6/675.3 | |
| 5,762,163 | A * | 6/1998 | Kain | E06C 1/393 | 182/162 |
| 6,189,653 | B1 * | 2/2001 | Laug | E06C 7/16 | 182/152 |
| 6,814,522 | B1 * | 11/2004 | Daniel, III | E04F 11/0255 | 182/1 |
| 9,587,434 | B2 * | 3/2017 | Frick | E04F 11/002 | |
| 10,889,993 | B2 * | 1/2021 | Bianchi | E04F 11/062 | |
| 2007/0056797 | A1 * | 3/2007 | Wang | E06C 1/20 | 182/21 |
| 2009/0020360 | A1 * | 1/2009 | May | E06C 1/387 | 182/1 |
| 2011/0024234 | A1 * | 2/2011 | Lin | E06C 1/387 | 182/161 |
| 2011/0139544 | A1 * | 6/2011 | Frick | E06C 7/42 | 182/27 |
| 2013/0037350 | A1 * | 2/2013 | Geiselman, III | E06C 7/16 | 182/159 |
| 2013/0292205 | A1 * | 11/2013 | Frick | E06C 7/42 | 182/156 |
| 2014/0345974 | A1 * | 11/2014 | Nebel | E06C 5/24 | 182/159 |
| 2018/0094484 | A1 * | 4/2018 | Frame | E06C 1/20 | |
| 2024/0151105 | A1 * | 5/2024 | Huang | E06C 7/183 | |
| 2024/0301751 | A1 * | 9/2024 | Leng | E06C 1/393 | |
| 2024/0426173 | A1 * | 12/2024 | Marini | E06C 1/20 | |
| 2025/0059770 | A1 * | 2/2025 | Merriam | E04F 11/0255 | |

* cited by examiner

FOLDABLE AND ANGULARLY ADJUSTABLE LADDER

CROSS REFERENCE OF RELATED APPLICATION

This is a U.S. National Stage under 35 U.S.C 371 of the International Application PCT/CN2020/093909, filed Jun. 2, 2020, which claims priority under 35 U.S.C. 119(a-d) to HK 19125133.9, filed Jun. 12, 2019 and CN 201920881109.9, filed Jun. 12, 2019.

BACKGROUND OF THE PRESENT INVENTION

Field of Invention

The present invention relates to a ladder which is able to adjust its angle between two different heights, and more particularly to a ladder which is able to change the inclination angle and a height spanned between the two ends of the ladder according to specific conditions.

Description of Related Arts

Scaffolding stairs and ladders are widely used as a component of scaffolding for facilitating climbers to get up and down. Common ladders are configured to climb up and down the side walls of buildings, and scaffolding stairs are configured to connect two floors. Generally speaking, in different applications, users choose the ladders or scaffolding stairs as required. When a required inclination angle is larger, a ladder is chosen; when a required inclination angle is smaller, a scaffolding stair is chosen. The common scaffolding stair or ladder comprises two poles and multiple stair treads, which is unfoldable. Ladders are easier to climb in the place where the inclination angle is not clear and climbers are carrying a lot of weight. Accordingly, the ladders, having a double-layered structure, comprises two side supports and multiple stair treads disposed between the two side supports. These ladders are foldable. However, the side supports are in direct contact with the stair treads, which is not only laborious while folding the ladders, but causes lots of wear at the contact.

SUMMARY OF THE PRESENT INVENTION

Aiming at deficiencies of the prior art, the present invention provides a foldable and angularly adjustable ladder, which is able to be adjusted according to the site environment in a simple way without using any special tools, so as to be adapted to various conditions such as the above-mentioned slopes and heights.

The ladder has a simple structure, is able to be manufactured quickly and at low cost, and reduce the loss during usage.

Accordingly, the present invention provides technical solutions as follows.

A foldable and angularly adjustable ladder comprises two side supports and multiple stair treads disposed between the two side supports, wherein two ends of each of the multiple stair treads are rotatably connected with the two side supports, respectively; each of the two side supports comprises an upper pole and a lower pole parallel to each other; two foot covers are disposed at a lower end of the two side supports, respectively; two upper poles and two lower poles are connected with two end surfaces of the each of the multiple stair treads through four connectors, respectively; each of the four connectors is sleeved with a metal ring piece, one end of the metal ring piece passes through one of the two end surfaces of the each of the multiple stair treads and is located at an inner side of the each of the multiple stair treads. In order to facilitate folding the ladder, the multiple stair treads and the two side supports must be rotatably relative to each other. Every connector is sleeved with a metal ring piece for preventing the left and right side plates of the stair treads from directly contacting the side supports, so as to reduce a friction between the side supports and the stair treads, which provides convenience to fold and unfold the ladder, and reduces the wear between the side supports and the stair treads.

Preferably, the metal ring piece comprises a metal cylinder and a circular ring provided at one end of the metal cylinder, wherein the metal cylinder and the circular ring are integrally formed.

Preferably, the each of the connectors comprises a screw rod and a screw cap, the metal ring piece is sleeved to the screw rod, the screw cap is located at the inner side of the each of the stair treads, the screw rod is sleeved with two gaskets, one surface of one of the two gaskets is in contact with an inner side face of the upper pole or the lower pole, another of the two gaskets is located at the inner side of the each of the stair treads and is in contact with the screw cap; the metal ring piece is located between the two gaskets.

Preferably, another surface of the one of the two gaskets, which is in contact with the inner side face of the upper pole or the lower pole, is in contact with the circular ring, that is, another surface of the gasket, which is in contact with the inner side face of the upper pole, is in contact with the circular ring; another surface of the gasket, which is in contact with the inner side face of the lower pole, is also in contact with the circular ring.

To maintain the stability of the ladder after being folded and prevent the stair treads from rotating relative to the two side supports, the ladder further comprises two retractable assemblies, each of which is located between the upper pole and the lower pole, and comprises an upper retractable lever, a lower retractable lever and an accommodating part provided between the upper retractable lever and the lower retractable lever, wherein an upper end of the upper retractable lever is rotatably connected with the upper pole, a lower end of the upper retractable lever is rotatably connected with the accommodating part; a lower end of the lower retractable lever is rotatably connected with the lower pole, an upper end of the lower retractable lever is rotatably connected with the accommodating part. Two nuts, which are located at a joint of the upper end of the upper retractable lever with the upper pole, and a joint of the lower end of the lower retractable lever with the lower pole, respectively, are configured to stabilize the unfolded ladder. After unfolding the ladder, an angle between the stair treads and the two side supports is adjusted, and then the two nuts are locked for preventing the each of the two retractable assemblies from rotating relative to the upper pole and the lower pole.

Further, a plastic ring is sleeved to each of eight connectors to help reduce metal loss and accidents while unfolding the ladder, wherein four of the eight connectors are configured to connect a highest stair tread with the two side supports, respectively; and remaining four of the eight connectors are configured to connect a lowest stair tread with the two side supports, respectively.

The plastic ring is located at an inner side of the highest stair tread or the lowest stair tread, one end of the plastic ring is in contact with the gasket which is located at the inner side of the highest stair tread or the lowest stair tread.

Preferably, the ladder further comprises at least one arm sleeve assembly, the at least one arm sleeve assembly comprises two metal tubes which are at a same height and fixed at an outer side face of two upper poles, respectively. An armrest for easy installation and removal is provided on each of the two metal tubes, which provides convenience for climbers to get on and off the ladder.

Preferably, the ladder further comprises two hanging hooks, each of which is provided at an upper end of the lower pole.

Beneficial effects of the present invention are as follows: In order to facilitate folding the ladder, the multiple stair treads and the two side supports must be rotatably relative to each other. Every connector is sleeved with a metal ring piece for preventing the left and right side plates of the stair treads from directly contacting the side supports, so as to reduce a friction between the side supports and the stair treads, which provides convenience to fold and unfold the ladder, and reduces the wear between the side supports and the stair treads.

DETAILED DESCRIPTION OF THE PREFERRED EMBODIMENT

Figure 1:
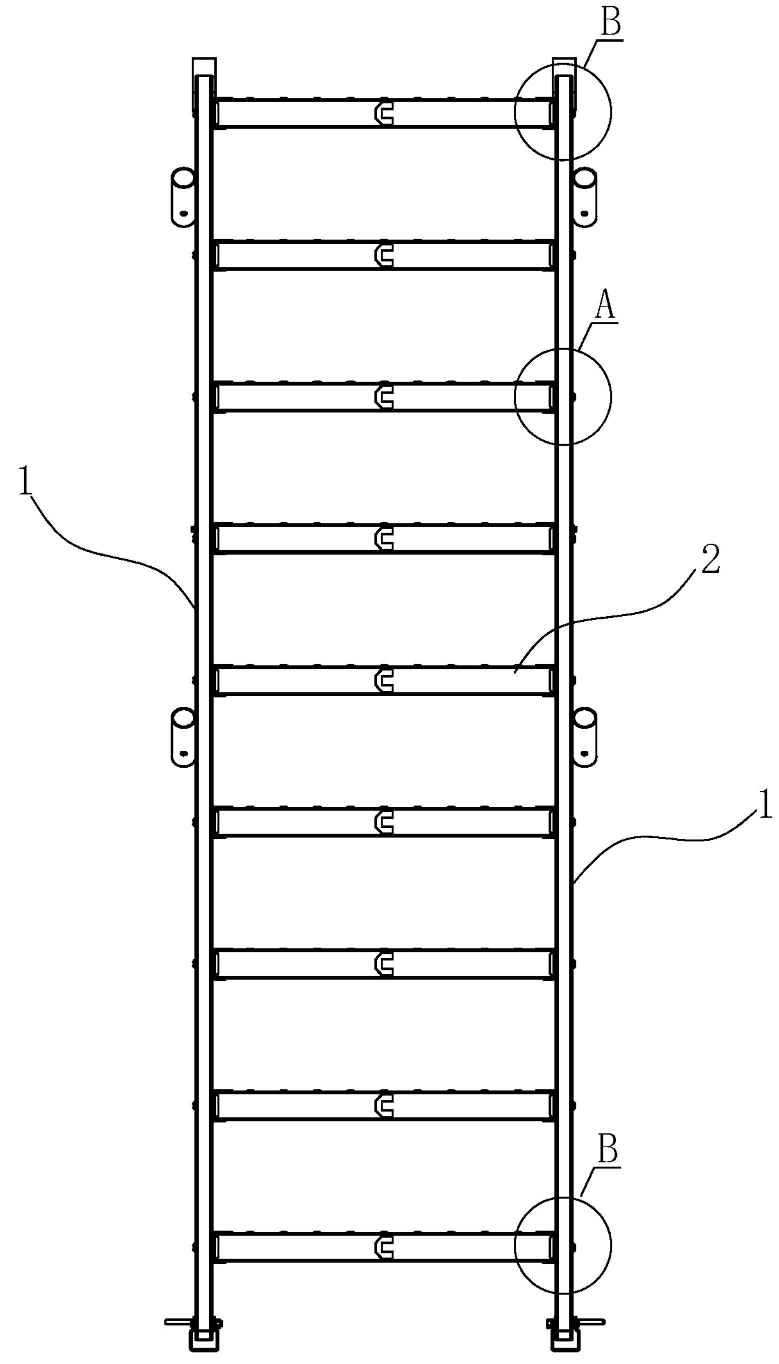
FIG. 1 is a main view of a foldable and angularly adjustable ladder provided by the present invention.
Figure 2:
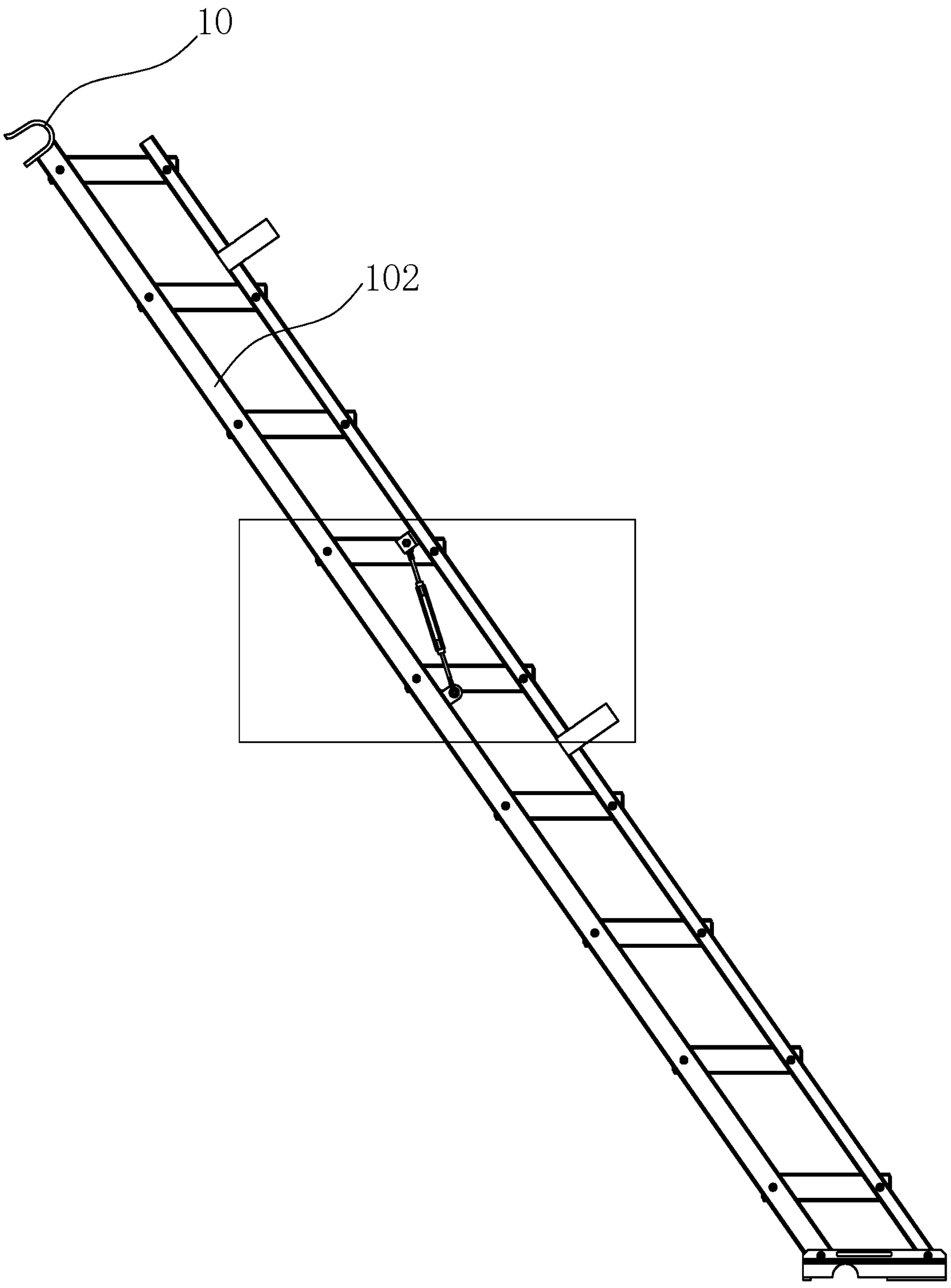
FIG. 2 is a left view of the foldable and angularly adjustable ladder provided by the present invention.
Figure 3:
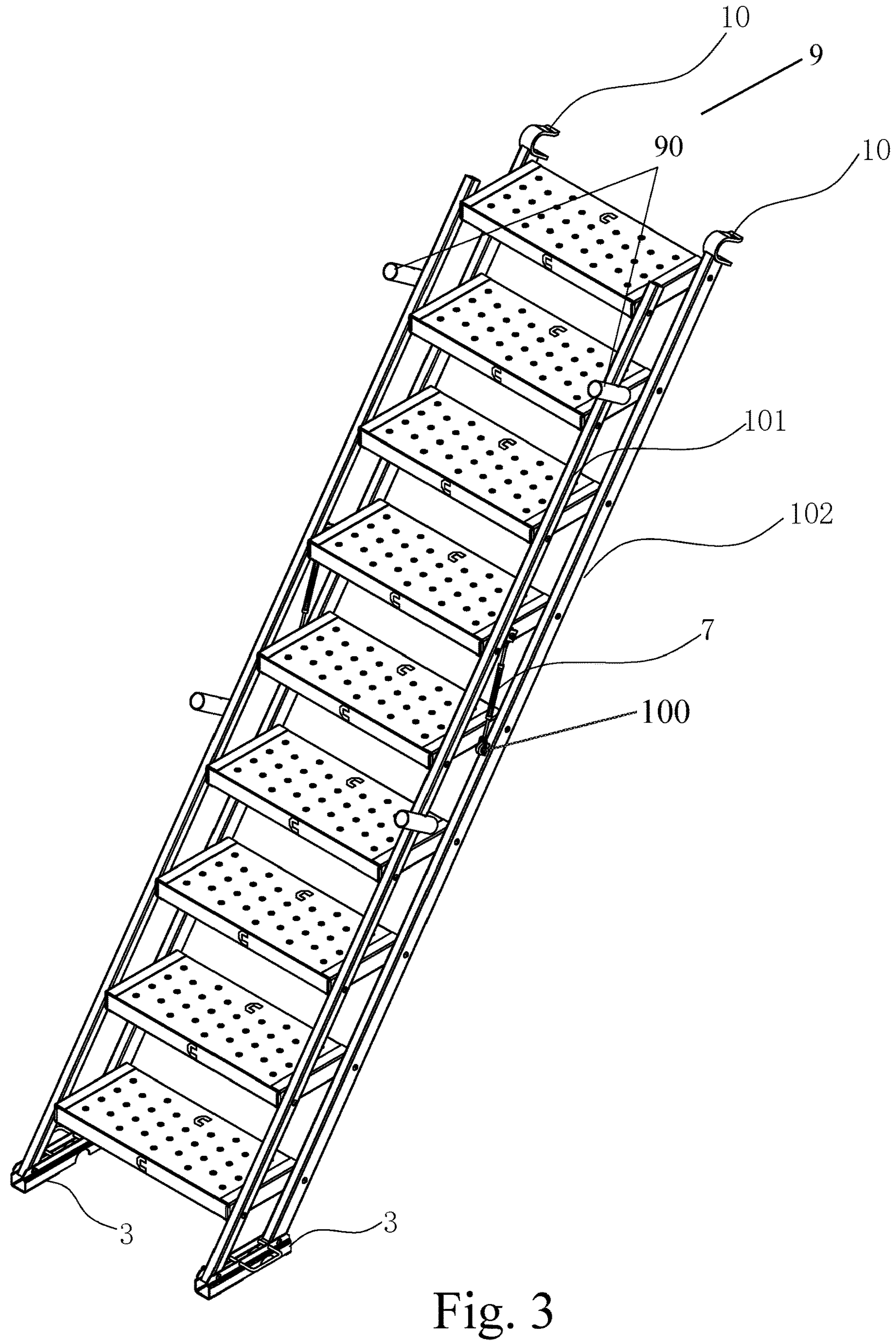
FIG. 3 is a stereogram of the foldable and angularly adjustable ladder provided by the present invention.
Figure 4:
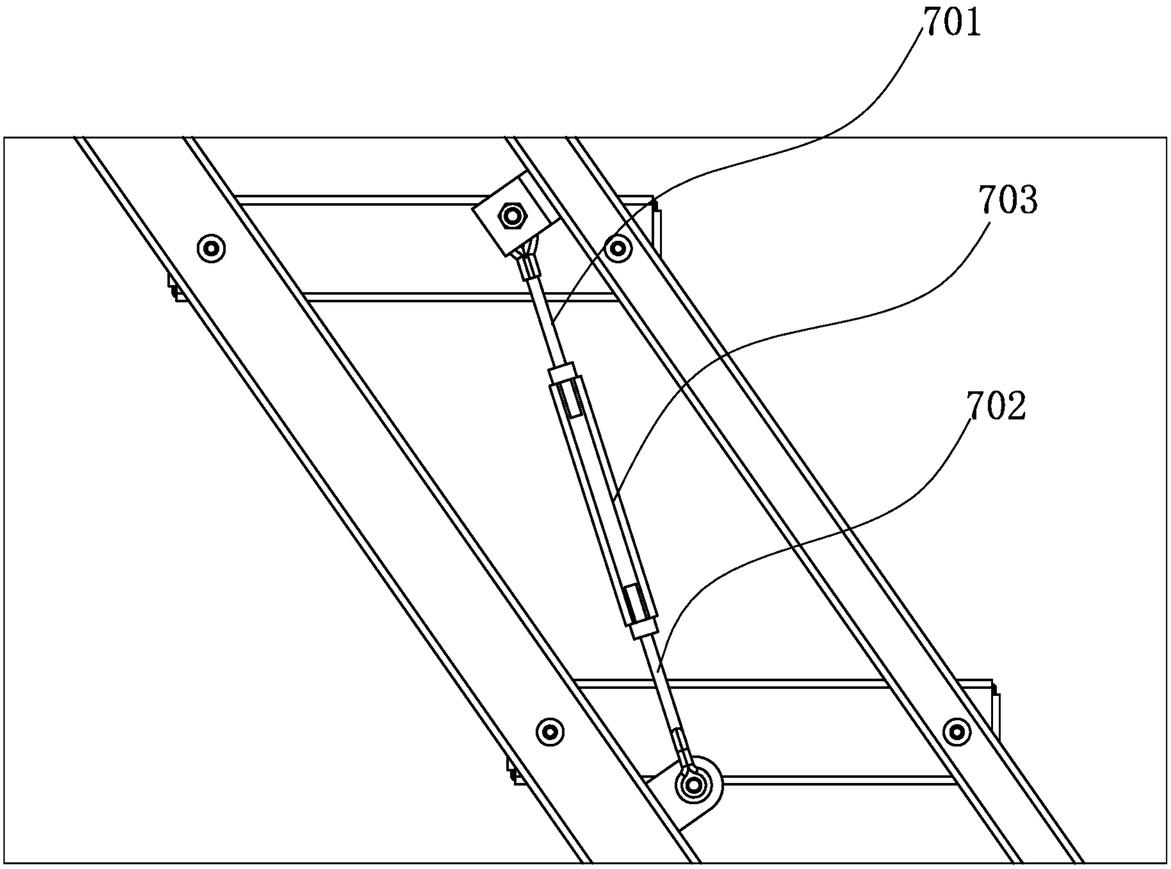
FIG. 4 is a partial enlarged view of FIG. 2.
Figure 5:
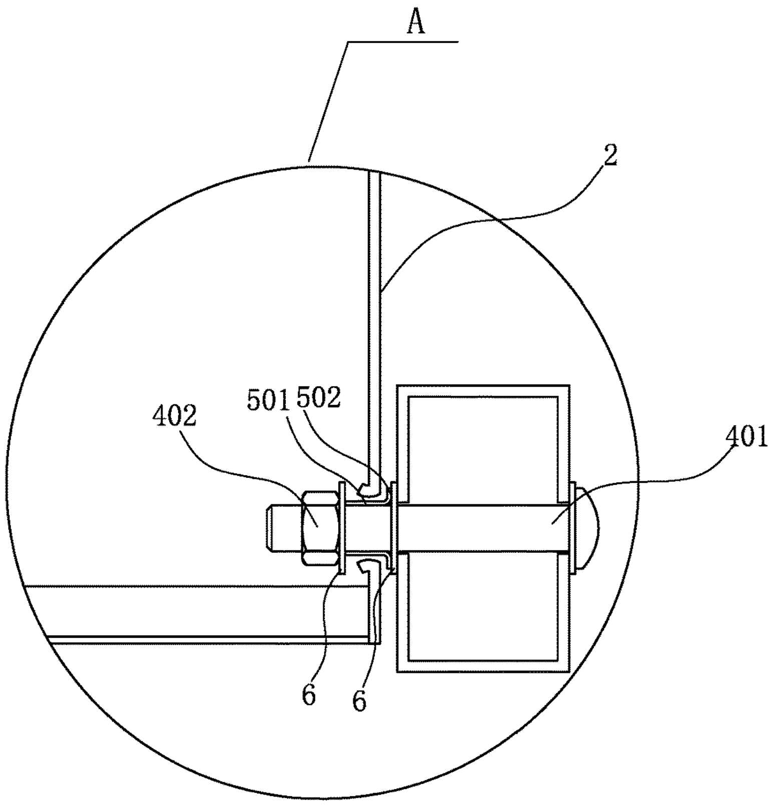
FIG. 5 is a partial enlarged view of A-portion in FIG. 1.

In order to enable those skilled in the art to better understand the present invention, the present invention is further explained in detail with drawings and embodiments as follows:

Referring to FIGS. 1 to 8, a foldable and angularly adjustable ladder according to a preferred embodiment of the present invention is illustrated, wherein the ladder comprises two side supports 1 and multiple stair treads 2 disposed between the two side supports 1, wherein two ends of each of the multiple stair treads 2 are rotatably connected with the two side supports 1, respectively; each of the two side supports 1 comprises an upper pole 101 and a lower pole 102 parallel to the upper pole 101; two foot covers 3 are disposed at a lower end of the two side supports 1, respectively; two upper poles 101 and two lower poles 102 are connected with two end surfaces of the each of the multiple stair treads 2 through four connectors 4, respectively; each of the four connectors 4 is sleeved with a metal ring piece 5, one end of the metal ring piece 5 passes through one of the two end surfaces of the each of the multiple stair treads 2 and is located at an inner side of the each of the multiple stair treads 2.

Since an amount of the multiple stair treads 2 of the ladder is flexible, the multiple stair treads should be understood to be at least three stair treads. Specifically, the each of the multiple stair treads 2 is a rectangular body which is formed by bending a front end and a rear end of a panel, and then enclosing the panel with a left side plate and a right side plate, wherein the rectangular body is maintained hollow, and the left side plate and the right side plate of the each of the multiple stair treads 2 are rotatably connected to the two side supports 1, respectively.

In order to facilitate folding the ladder, the multiple stair treads and the two side supports must be rotatably relative to each other. Every connector is sleeved with a metal ring piece for preventing the left and right side plates of the stair treads from directly contacting the side supports, so as to reduce a friction between the side supports and the stair treads, which provides convenience to fold and unfold the ladder, and reduces the wear between the side supports and the stair treads.

According to the preferred embodiment of the present invention, the metal ring piece 5 comprises a metal cylinder 501 and a circular ring 502 provided at one end of the metal cylinder 501, wherein the metal cylinder 501 and the circular ring 502 are integrally formed.

According to preferred embodiment of the present invention, the each of the connectors 4 comprises a screw rod 401 and a screw cap 402, the metal ring piece 5 is sleeved to the screw rod 401, the screw cap 402 is located at the inner side of the each of the stair treads 2, the screw rod is sleeved with two gaskets 6, one surface of one of the two gaskets 6 is in contact with an inner side face of the upper pole 101 or the lower pole 102, that is, one surface of a gasket 6 adapted for a connection between the upper pole 101 and the one of the two end surfaces of the each of the stair treads is in contact with the inner side face of the upper pole 101, one surface of a gasket 6 adapted for a connection between the lower pole 102 and the one of the two end surfaces of the each of the stair treads is in contact with the inner side face of the lower pole 102; another of the two gaskets 6 is located at the inner side of the each of the stair treads and is in contact with the screw cap 402; the metal ring piece 5 is located between the two gaskets 6. Obviously, the connectors 4 are able to be other structures, such as rivets, which are configured to connect two upper poles 101 and two lower poles 102 with the each of the stair treads 2, enabling two upper poles 101 and two lower poles 102 to rotate relative to the each of the stair treads 2, facilitating folding and unfolding the ladder.

Moreover, another surface of the one of the two gaskets 6, which is in contact with the inner side face of the upper pole 101 or the lower pole 102, is in contact with the circular ring 502, that is, another surface of the gasket 6, which is in contact with the inner side face of the upper pole 101, is in contact with the circular ring 502; another surface of the gasket 6, which is in contact with the inner side face of the lower pole 102, is also in contact with the circular ring 502.

To maintain the stability of the ladder after being folded and prevent the stair treads 2 from rotating relative to the two side supports 1, the ladder further comprises two retractable assemblies 7, each of which is located between the upper pole 101 and the lower pole 102 and comprises an upper retractable lever 701, a lower retractable lever 702 and an accommodating part 703 provided between the upper retractable lever 701 and the lower retractable lever 702, wherein an upper end of the upper retractable lever 701 is rotatably connected to the upper pole 101, a lower end of the upper retractable lever 701 is rotatably connected with the accommodating part 703; a lower end of the lower retractable lever 702 is rotatably connected with the lower pole 102, an upper end of the lower retractable lever 702 is rotatably connected with the accommodating part 703. Two nuts 100, which are located at a joint of the upper end of the upper retractable lever 701 with the upper pole 101, and a joint of the lower end of the lower retractable lever 702 with the lower pole 102, respectively, is configured to stabilize the unfolded ladder. After unfolding the ladder, an angle between the stair treads 2 and the two side supports 1 is adjusted, and then the two nuts 100 are locked for preventing the each of the two retractable assemblies 7 from rotating relative to the upper pole 101 and the lower pole 102. The two retractable assemblies 7 are commercially available.

Further, a plastic ring 8 is sleeved to each of eight connectors 4 for to help reduce metal loss and accidents while unfolding the ladder, wherein four of the eight connectors are configured to connect a highest stair tread with the two side supports, respectively; and remaining four of the eight connectors are configured to connect a lowest stair tread with the two side supports, respectively.

Figure 6:
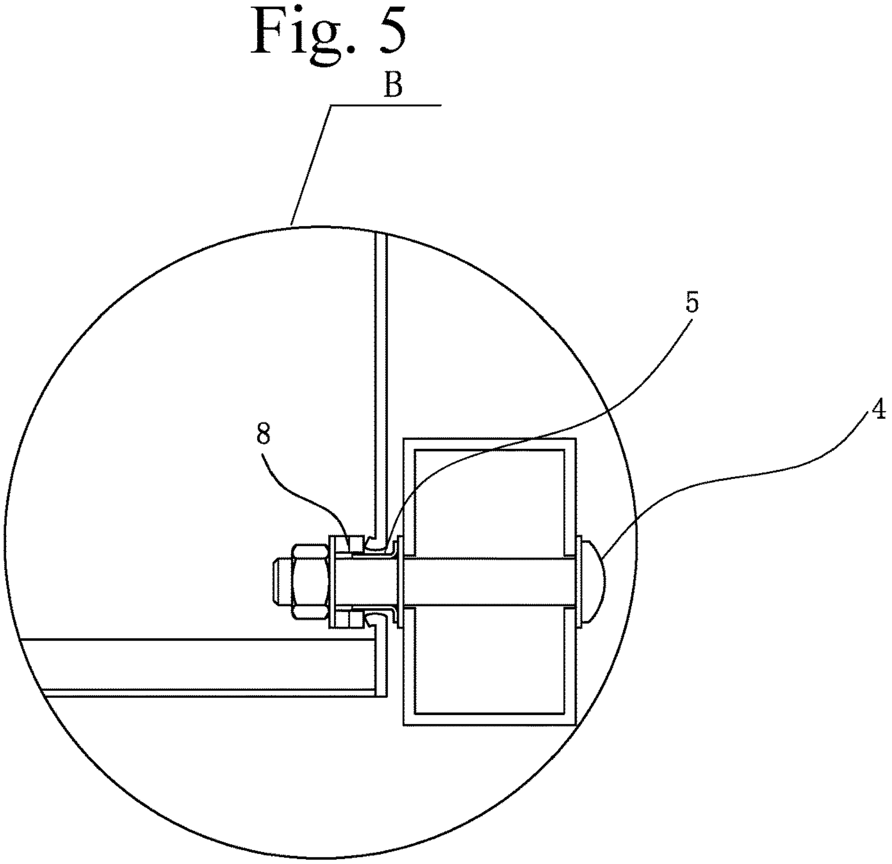
FIG. 6 is a partial enlarged view of B-portion in FIG. 1.
Figure 7:
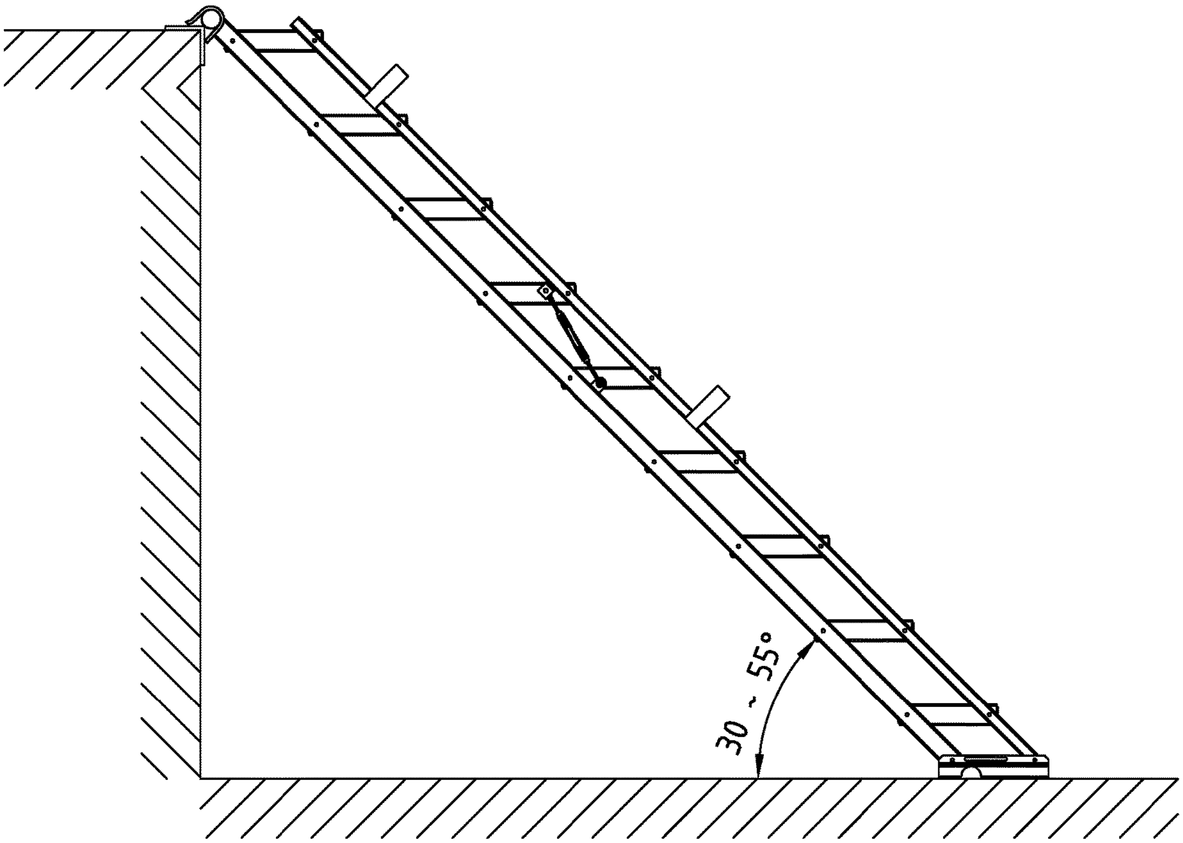
FIG. 7 is a left view of a ladder provided by the present invention at a small inclination angle.
Figure 8:
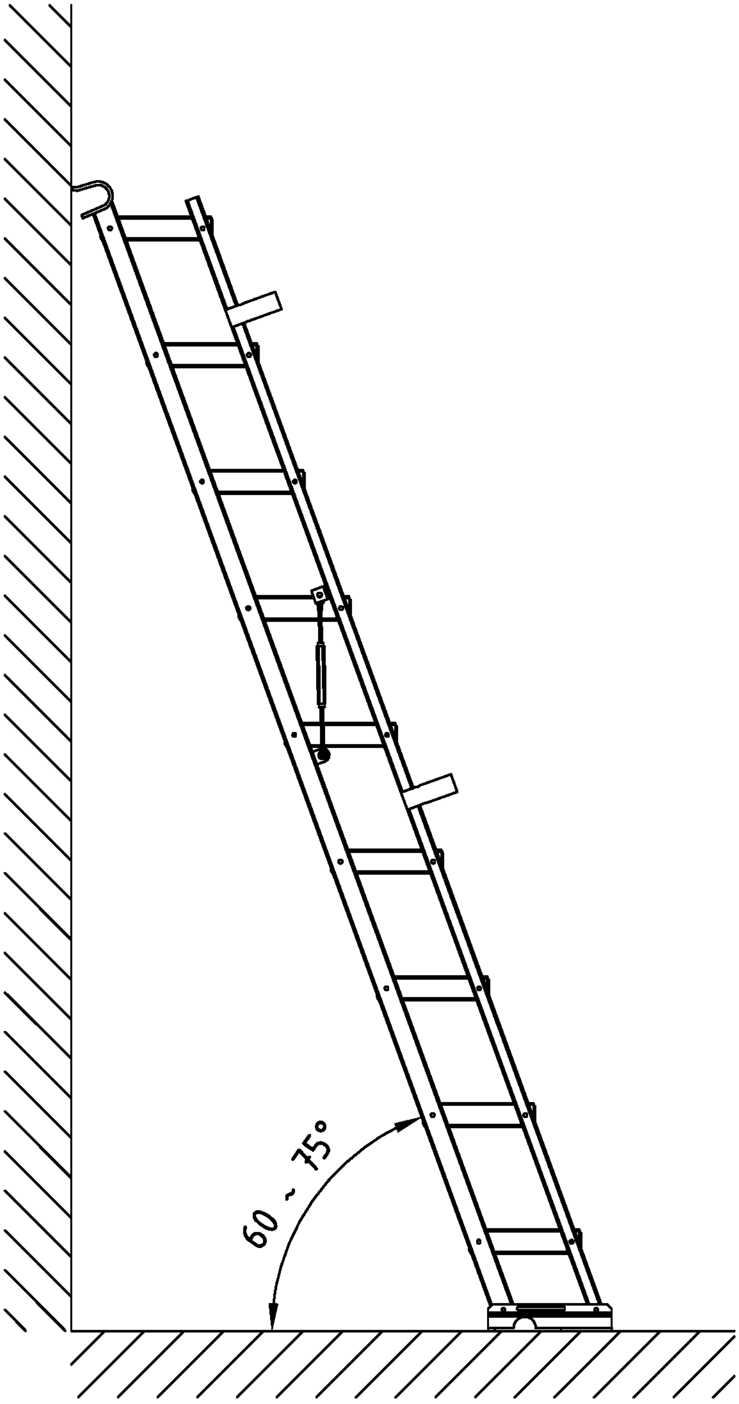
FIG. 8 is a left view of the ladder provided by the present invention at a large inclination angle.

The plastic ring 8 is located at an inner side of the highest stair tread or the lowest stair tread, one end of the plastic ring 8 is in contact with the gasket 6 which is located at the inner side of the highest stair tread or the lowest stair tread, referring to FIG. 6.

According to the preferred embodiment of the present invention, the ladder further comprises at least one arm sleeve assembly 9, the at least one arm sleeve assembly 9 comprises two metal tubes 90 which are at a same height and fixed at an outer side face of two upper poles 101, respectively. An armrest for easy installation and removal is provided on each of the two metal tubes 90, which provides convenience for climbers to get on and off the ladder. An amount of the arm sleeve assemblies 9 is determined according to an overall length of the ladder. According to the preferred embodiment of the present invention, there are two arm sleeve assemblies 9 required.

According to the preferred embodiment of the present invention, the ladder further comprises two hanging hooks 10 provided at an upper end of two lower poles 102, respectively, which provides convenience to hang an upper end of the ladder to a top of a support object for preventing the ladder from moving, ensuring safety for the user.

Figure 9:
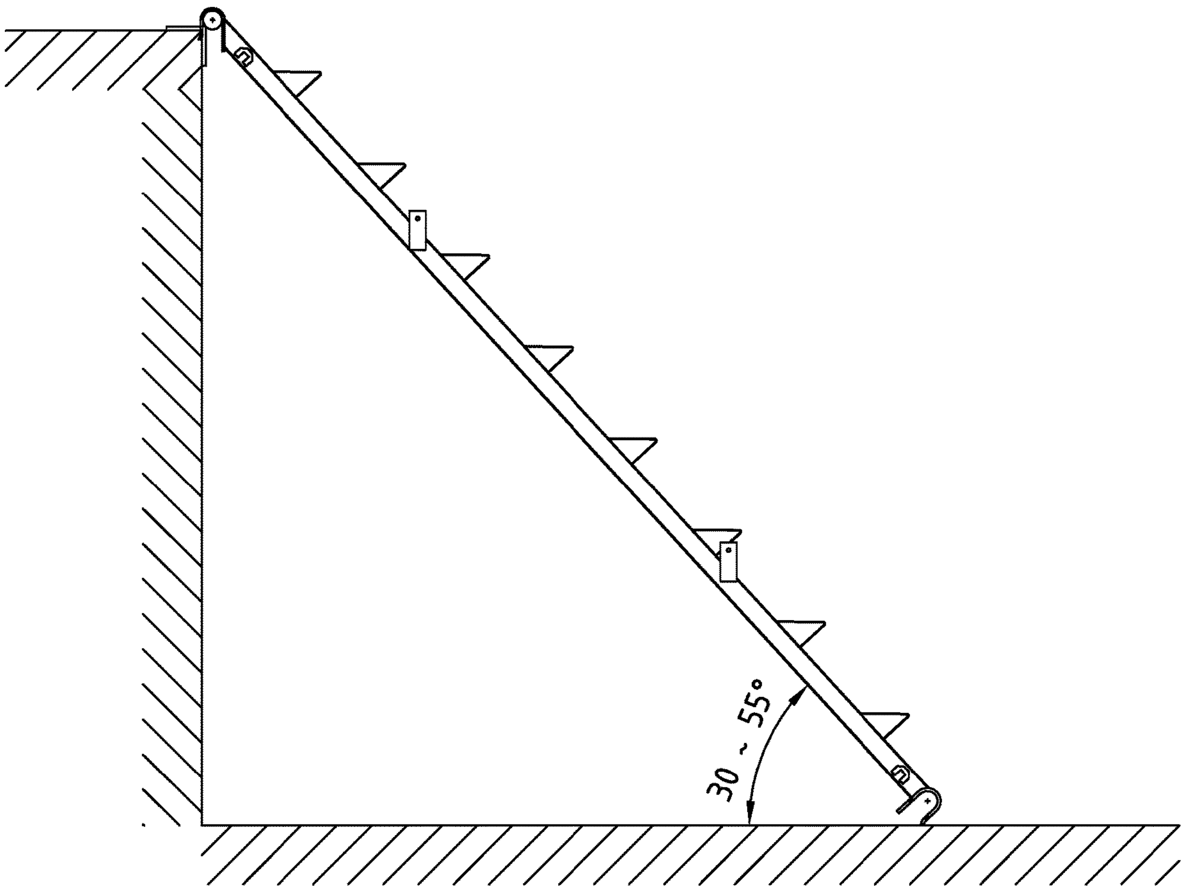
Fig. 9 (Prior Art)
FIG. 9 shows an application of a scaffolding stair in the prior art at a small inclination angle.
Figure 10:
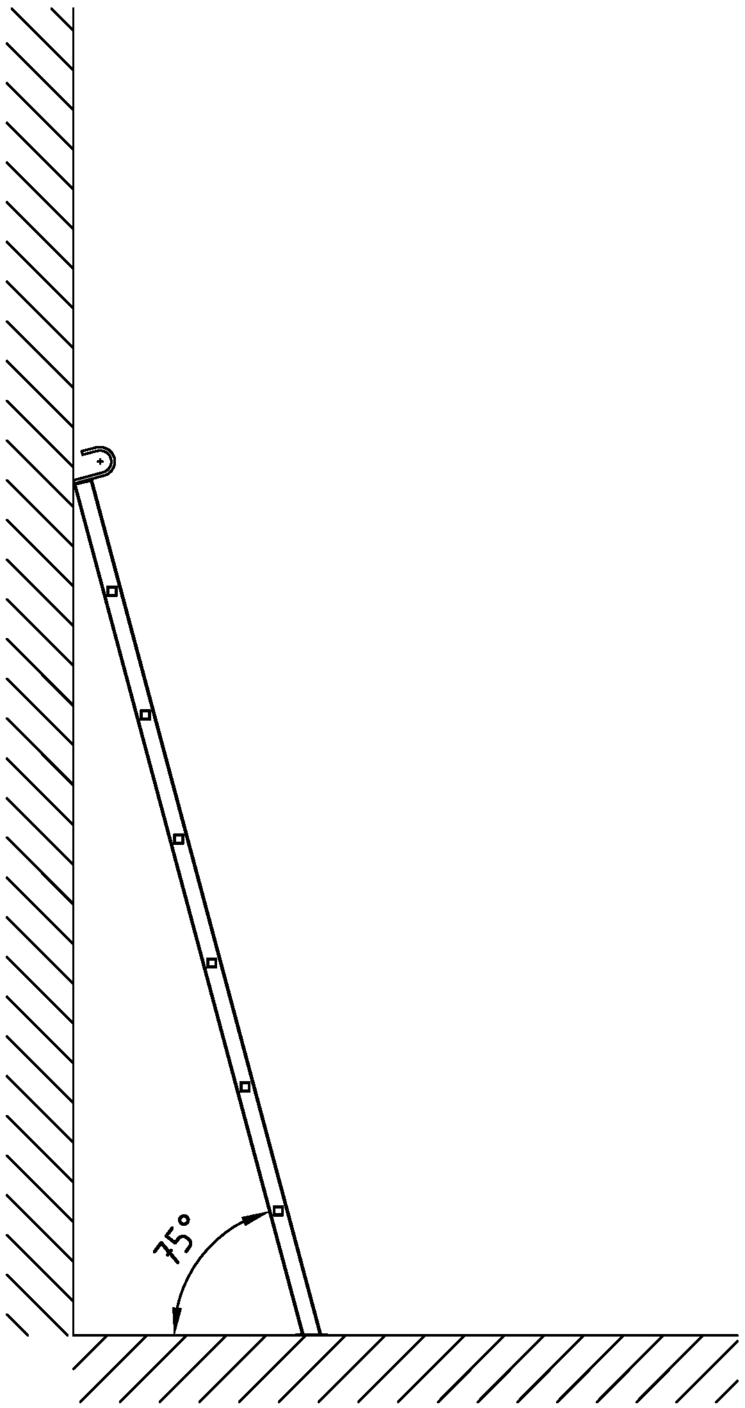
Fig. 10 (Prior Art)
FIG. 10 shows an application of a ladder in the prior art at a large inclination angle.

FIGS. 9 to 10 show the use of a scaffolding stair and a ladder in the prior art, respectively.

In the above description, it should be noted that, unless otherwise clearly specified and limited, the term "connection" should be understood in a broad sense, for example, it may be fixed connection, detachable connection, or integral connection; it also may be a direct connection, an indirect connection through an intermediate medium, or a connection between two components. For those skilled in the art, the specific meaning of the above-mentioned terms in the present invention is able to be understood under specific circumstances.

Although the present invention has been described through the embodiments, for those skilled in the art, it should be known that the present invention has many modifications and changes without departing from the spirit of the present invention, and the appended claims include these modifications and changes without departing from the spirit of the present invention.

What is claimed is:

1. A foldable and angularly adjustable ladder, which comprises two side supports, multiple stair treads disposed between the two side supports, and two retractable assemblies, wherein:

two ends of each of the multiple stair treads are rotatably connected with the two side supports, respectively;

each of the two side supports comprises an upper pole and a lower pole parallel to the upper pole;

two foot covers are disposed at a lower end of the two side supports, respectively;

two upper poles and two lower poles are connected with two end surfaces of the each of the multiple stair treads through four connectors, respectively;

each of the four connectors is sleeved with a metal ring piece, one end of the metal ring piece passes through one of the two end surfaces of the each of the multiple stair treads and is located at an inner side of the each of the multiple stair treads, wherein the metal ring piece comprises a metal cylinder and a circular ring provided at one end of the metal cylinder, the metal cylinder and the circular ring are integrally formed;

the each of the connectors comprises a screw rod and a screw cap, wherein the metal ring piece is sleeved to the screw rod, the screw cap is located at the inner side of the each of the stair treads, the screw rod is sleeved with two gaskets, one surface of one of the two gaskets is in contact with an inner side face of the upper pole or the lower pole; another surface of the one of the two gaskets, which is in contact with the inner side face of the upper pole or the lower pole, is in contact with the circular ring; another of the two gaskets is located at the inner side of the each of the stair treads and is in contact with the screw cap; the metal ring piece is located between the two gaskets;

each of the retractable assemblies is located between the upper pole and the lower pole, and comprises an upper retractable lever, a lower retractable lever and an accommodating part provided between the upper retractable lever and the lower retractable lever, wherein:

an upper end of the upper retractable lever is rotatably connected with the upper pole, a lower end of the upper retractable lever is rotatably connected with the accommodating part; a lower end of the lower retractable lever is rotatably connected with the lower pole, an upper end of the lower retractable lever is rotatably connected with the accommodating part.

2. The foldable and angularly adjustable ladder according to claim 1, wherein a plastic ring is sleeved to each of eight connectors, wherein four of the eight connectors are configured to connect a highest stair tread with the two side supports, respectively; and remaining four of the eight connectors are configured to connect a lowest stair tread with the two side supports, respectively.

3. The foldable and angularly adjustable ladder according to claim 2, wherein the plastic ring is located at an inner side of the highest stair tread or the lowest stair tread, one end of the plastic ring is in contact with one of the two gaskets which is located at the inner side of the highest stair tread or the lowest stair tread.

4. The foldable and angularly adjustable ladder according to claim 3, further comprising at least one arm sleeve assembly, wherein the at least one arm sleeve assembly comprises two metal tubes which are at a same height and fixed at an outer side face of two upper poles, respectively.

5. The foldable and angularly adjustable ladder according to claim 4, further comprising two hanging hooks, each of which is provided at an upper end of the lower pole.

* * * * *